United States Patent
Wu et al.

(10) Patent No.: US 12,152,931 B2
(45) Date of Patent: Nov. 26, 2024

(54) LOW NOISE OPTOTHERMALLY STABLE METERING STRUCTURE

(71) Applicant: Eagle Technology, LLC, Melbourne, FL (US)

(72) Inventors: Gordon Chun Kong Wu, Melbourne, FL (US); Nicholas Piekiel, Rochester, NY (US); Kenneth M. Patterson, Rochester, NY (US); Brian Hart, Rochester, NY (US); John Osborn, Spencerport, NY (US); Peter Bickford, Rochester, NY (US); Mitchell Gibson, Webster, NY (US)

(73) Assignee: Eagle Technology, LLC, Melbourne, FL (US)

( * ) Notice: Subject to any disclaimer, the term of this patent is extended or adjusted under 35 U.S.C. 154(b) by 342 days.

(21) Appl. No.: 17/825,673

(22) Filed: May 26, 2022

(65) Prior Publication Data

US 2023/0384151 A1 Nov. 30, 2023

(51) Int. Cl.
*G01J 1/04* (2006.01)
*G01J 1/02* (2006.01)

(52) U.S. Cl.
CPC .......... *G01J 1/0403* (2013.01); *G01J 1/0214* (2013.01)

(58) Field of Classification Search
CPC .......... G01J 1/0403; G01J 1/0214; G01J 1/04; G02B 5/00; G02B 5/003; G02B 2207/101
See application file for complete search history.

(56) References Cited

U.S. PATENT DOCUMENTS

| | | | |
|---|---|---|---|
| 6,538,736 B1 | 3/2003 | Palumbo | |
| 7,247,852 B2 | 7/2007 | Jenkins | |
| 7,926,961 B2 | 4/2011 | Shaw et al. | |
| 9,039,210 B2 | 5/2015 | Longerich et al. | |
| 9,823,459 B2 | 11/2017 | Bullard et al. | |
| 10,338,371 B1 | 7/2019 | Morrison | |
| 2006/0255275 A1* | 11/2006 | Garman | H04N 5/33 250/338.1 |
| 2024/0118134 A1* | 4/2024 | Wu | G01J 1/0437 |

OTHER PUBLICATIONS

Hagopian, J. et al. "Carbon Nanotubes on Titanium Substrates for Stray Light Suppression" NASA Tech Briefs, Apr. 1, 2011.
Katsir, D. Stray Light Reduction in Industrial Optics, Mar. 11, 2021.
(Continued)

*Primary Examiner* — Kevin K Pyo
*Assistant Examiner* — Don J Williams
(74) *Attorney, Agent, or Firm* — Fox Rothschild LLP; Carol E. Thorstad-Forsyth

(57) ABSTRACT

Metering structure includes a rigid strut configured to support an optical element. A rigid shield mounted on the strut has a shield length which is substantially coextensive with the elongated length of the rigid strut such that rigid shield substantially encloses the strut along the entire shield length. The rigid shield has a surface finish which is highly absorptive of electromagnetic radiation in the optical spectrum. One or more thermal insulating material layers comprise a multi-layer insulation (MLI) system disposed between the rigid strut and the rigid shield. Rigid and flexure brackets secure the rigid shield to the strut.

21 Claims, 7 Drawing Sheets

(56) References Cited

OTHER PUBLICATIONS

NPL—Waddell, P. "Telescope Stray Light Fundamental Optical Plumning and Early Experience" with SOFIA Science Center, Feb. 15, 2017.

A. Yevtushenko, A. von Finck, D. Katsir, H. Shfaram, Angela Duparré, "Vane-free design for star trackers and telescopes," Proc. SPIE 10562, International Conference on Space Optics—ICSO 2016, 1056215 (Sep. 25, 2017.

* cited by examiner

LOW NOISE OPTOTHERMALLY STABLE METERING STRUCTURE

BACKGROUND

Statement of the Technical Field

The technical field of this disclosure concerns sensor systems, and more particularly structures which are used to support elements of sensor systems.

Description of the Related Art

The related art concerns methods and systems for implementing metering structures. Metering structures are used in certain types of sensors, such as optical sensors, to precisely control spacings and orientations of elements which comprise the sensor system. For example, in a telescope type optical sensor a metering structure may be used to control a spacing and orientation of a primary mirror and a secondary mirror which form the telescope. The metering structure can be formed in various ways but will often include one or more elongated struts or rigid members to support the sensor elements.

An optical sensor which is used in space may be subjected to a highly dynamic thermal environment which can include rapid changes in thermal loads. Therefore, a metering structure for such an optical sensor must be capable of maintaining precise spacing and orientation of optical components under all such thermal conditions. Optothermal stability refers to the degree to which an element (e.g., a rigid strut) used in a system will deform in response to changes in a thermal environment. Accordingly, optothermal stability is an important concern when designing metering systems that are used in dynamic thermal environments.

Another design consideration relating to metering structures involves management of stray light. Stray light which originates from bright objects near a telescope field of view (FOV) can be a significant noise source when attempting to acquire faint images. Consequently, the presence of stray light can limit mission operations and on-orbit observation efficiency. The stray light problem is particularly problematic when making observations involving a dimly lit subject while in the presence of a nearby stray light source. Various techniques have been proposed for minimizing stray light in a metering structure. However, due to the intricate design constraints involved, none of these techniques have been found to be entirely satisfactory.

SUMMARY

This document concerns a metering structure for an optical sensor. The metering structure includes a rigid strut having an elongated length and is configured to support an optical element of an optical sensor system. A rigid shield is mounted on the strut. The rigid shield has a shield length which is substantially coextensive with the elongated length of the rigid strut such that the rigid shield substantially encloses the strut along the entire shield length. In some scenarios, the rigid shield can be formed of two or more component parts. For example, the rigid shield can be comprised of two or more shield members which respectively form opposing sides of the rigid shield.

The rigid shield has a surface finish which is highly absorptive of electromagnetic radiation in the optical spectrum. This surface finish is provided on an exterior surface of the rigid shield along the shield length. In some scenarios, the surface finish can be a coating disposed on the outer surface of the shield and comprised of carbon nanotubes. The shield can also include a surface structure configured to reduce reflections of stray electromagnetic radiation in the optical spectrum. The surface structure can involve corrugations or contours in the shield which help reduce the occurrence of stray light.

The metering structure advantageously includes one or more thermal insulating material layers forming a multi-layer insulation (MLI) system. The MLI system is disposed between the rigid strut and the rigid shield. The MLI system surrounds the rigid strut and is substantially coextensive with the shield length. The plurality of material layers comprising the MLI are advantageously configured to at least partially thermally decouple the rigid strut from the rigid shield. The rigid shield can have a cross-sectional profile shape that is the same or different as compared to a cross-sectional profile shape of the rigid strut. In some scenarios, the cross-sectional profile shape of the rigid shield may be configured to minimize reflection of stray electromagnetic radiation in the optical spectrum.

The rigid shield described herein can be mounted on the strut using a rigid bracket at a first location disposed along the elongated length. The rigid bracket advantageously includes at least one thermal isolating component which is comprised of a low thermal conductivity material and is configured to minimize transmission of thermal energy between the rigid strut and the rigid shield. According to one aspect, the rigid bracket used to mount the shield is advantageously used at only one location along the elongated length.

At one or more second locations, the rigid shield is mounted on the strut using a flexure bracket. These second locations can be spaced apart from the first location along the elongated length of the strut. The flexure bracket is configured to flex so that the attachment point on the shield can move slightly relative to the attachment point on the strut. For example, the flexure bracket can allow such movement to occur in a direction aligned with a major axis of the strut and/or in directions which are transverse to such axis. As such, the one or more flexure brackets can compensate or absorb mechanical stresses which are caused by a coefficient of thermal expansion (CTE) mismatch between the rigid shield and the strut.

This document also concerns a method for providing a thermally stable metering structure. The method involves using a rigid strut having an elongated length to support in a position an optical element of an optical sensor system. A rigid shield mounted on the strut is used to support a surface finish which is highly absorptive of electromagnetic energy within the optical spectrum. The rigid shield surrounds the strut along the elongated length. The method can also involve forming the surface finish using a coating comprised of carbon nanotubes disposed on an outer surface of the rigid shield.

In some scenarios, the rigid shield can be assembled on the rigid strut using two or more shield components. For example, the shield can be assembled by joining two or more shield members which respectively form opposing sides of the rigid shield. The method further involves at least partially thermally decoupling the strut from the rigid shield. This is accomplished by using one or more insulating layers which are disposed between the rigid strut and the rigid shield.

One or more flexure brackets are used to absorb certain mechanical stresses caused by a CTE mismatch between the rigid shield and the rigid strut. To facilitate this aspect, the one or more flexure brackets can be advantageously disposed at one or more locations spaced apart along the elongated length of the strut. The method can also involve securing the rigid shield on the strut using a rigid bracket at a location along the elongated length. According to one aspect, the shield can be secured to the strut using the rigid bracket at only one location along the elongated length.

In some scenarios, the method can involve selecting a cross-sectional profile shape of the rigid shield to be different as compared to a cross-sectional profile shape of the rigid strut. For example, a designer can advantageously select the cross-sectional profile shape of the rigid shield to minimize reflection of stray electromagnetic energy in the optical spectrum. Transmission of thermal energy between the rigid strut and the rigid shield can be further minimized by using at least one thermal isolating component comprised of a low thermal conductivity material. Such thermal isolating component(s) can be used advantageously to minimize transmission of thermal energy through the rigid bracket.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

DETAILED DESCRIPTION

Figure 1B:
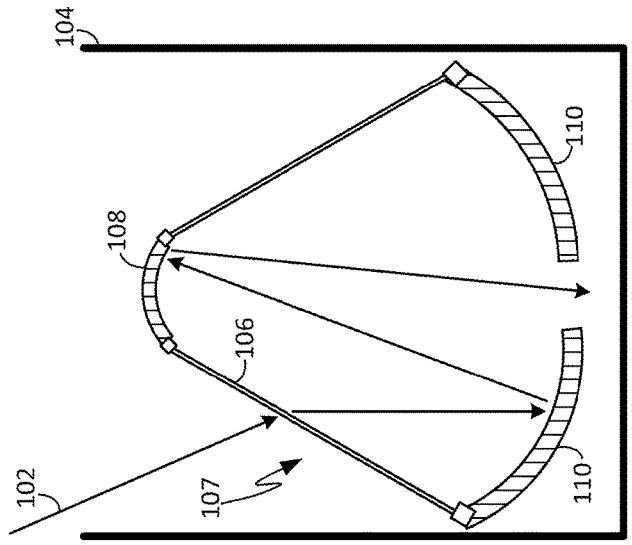
FIGS. 1A-1B are a series of drawings that are useful for understanding the problem of stray light in an optical sensor platform.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

Figure 2B:
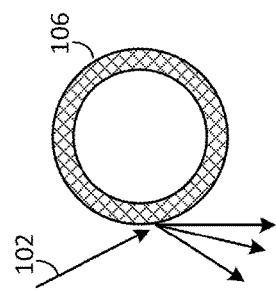
FIGS. 2A-2B are a series of drawings that are useful for understanding how stray light can be reflected off of support elements which comprise a metering structure.
Figure 1A:
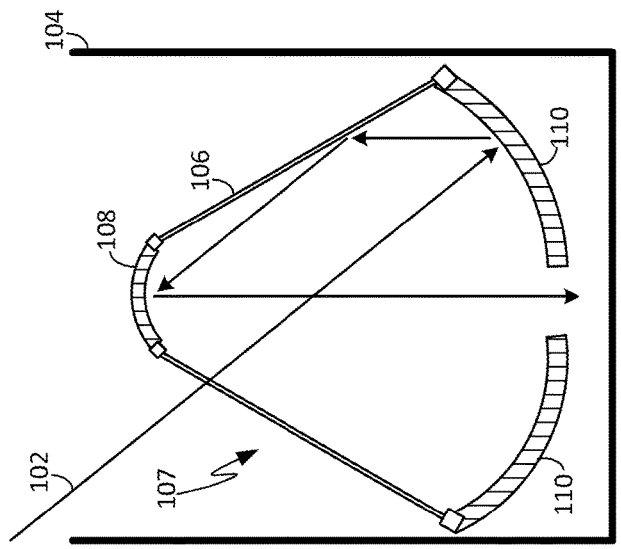
Figure 2A:
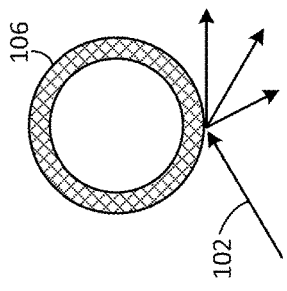

Stray light originating from bright objects near a field of view (FOV) of an optical sensing system is a significant noise source for imaging faint objects. As used herein, the term stray light refers to electromagnetic radiation within the optical spectrum that is unwanted and interferes with the performance or intended function of the optical system. Electromagnetic radiation in the optical spectrum can include light in the ultra-violet, visible and/or infrared range of the electromagnetic spectrum. In some scenarios, stray light can be caused by unwanted light which scatters and reflects off the metering structure. Stray light reflecting from support struts of a metering structure and into a light path of the optical sensing system can be a large contributor for such optical noise. This is illustrated in FIGS. 1A and 1B which show how stray light 102 entering an optical sensor baffle 104 can be reflected off a strut 106 in a metering structure 107 supporting mirrors 108, 110. A cross-sectional view of optical struts 106 shown in FIGS. 2A and 2B, illustrate how stray light 102 can reflect from an underside of a strut or from a side of a strut to eventually travel into the optical path of a sensor.

High absorptance black paints can help reduce the occurrence of stray light. But use of such coatings can be a problem if multi-layer insulation (MLI) blankets are to be wrapped around struts for achieving thermal-optical stability. These highly flexible blankets are generally not suitable as carrier surfaces for the high absorptance (black) paints. Struts can also be formed with a cross-sectional shape which is optimized for reducing reflection of stray light into the path of the optical sensing system. However, MLI blankets used to achieve thermal-optical stability can partially obscure the cross-sectional shape so that it is less effective at reducing stray light. The resulting stray light problem can limit mission operations and on-orbit observation efficiency.

Figure 3:
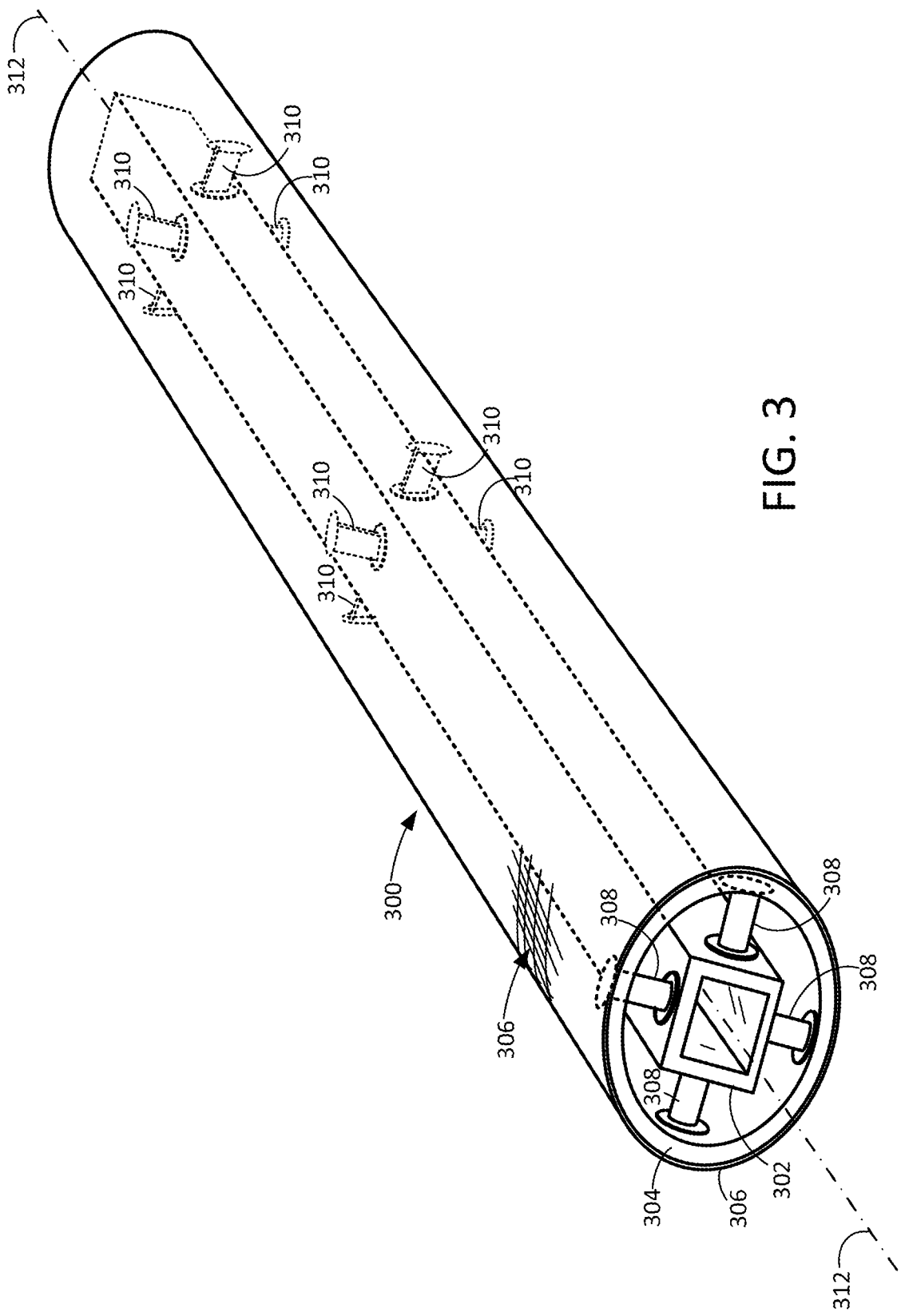
FIG. 3 is a drawing that is useful for understanding an assembly including a rigid shield mounted on a strut to reduce the negative effects of stray light in a metering structure.

In a solution disclosed herein, a metering structure for an optical sensor system is comprised of one or more rigid struts, each having an elongated length and configured to support an optical element in a position within the optical sensor system. Opto-thermal stability and low optical noise is facilitated using rigid shields mounted on the one or more struts. An example of the foregoing arrangement is illustrated in FIG. 3 which shows a shielded strut 300. The shielded strut 300 is comprised of an elongated rigid strut 302 that is used to support an optical element in a metering structure. Only a single strut is shown in FIG. 3, but it will be understood that a metering system can comprise a plurality of such rigid struts which form the structure of the metering system. A rigid shield 304 surrounds the elongated length of the strut. The rigid shield can have one or more surface properties facilitated by a surface finish which causes the shield to be highly absorptive and/or minimize reflected electromagnetic radiation within the optical spectrum. In this example, the strut and the shield are arranged so that an elongated length of each of these elements is coaxially aligned along a central axis 312. However, coaxial alignment of the strut and the shield is not necessary. In some scenarios, it may be advantageous to offset the alignment of a central axis associated with the shield as compared to the strut. The rigid shield and the strut can each be formed of a light-weight composite material, a metal alloy or any other material suitable for the anticipated environmental conditions in which the optical sensor is to be deployed. In some scenarios, the shield can be open at opposing ends of its elongated length to allow a small portion of the strut to protrude. However, the solution is not limited in this regard and the ends of the shield can optionally be configured so as to completely enclose the rigid strut at the opposing ends thereof.

In some scenarios, the surface finish on the rigid shield can be facilitated by one or more material components which are integrated into a material comprising the rigid shield. For example, the surface properties can be facilitated by fillers, additives, compounds, and/or dyes which are added to a material forming the shield. The integrated materials can result in the rigid shield having a surface finish produced by the integral components which facilitates absorption of electromagnetic radiation in the optical spectrum. Alternatively, the material comprising the rigid shield can support a coating 306 on its surface to facilitate a desired surface finish. A surface coating 306 which is used with the rigid shield can be comprised of a material that is highly absorptive of electromagnetic radiation in the optical spectrum.

For purposes of this disclosure, a surface finish that is highly absorptive can be understood to include those surface finishes which have an absorptance of at least 93%. In some scenarios, the surface finish can be highly absorptive of light in one or more of the visible, infrared and/or ultraviolet spectrum. In some scenarios, a material used to facilitate a desired surface finish can be one of a class of super-black coatings which have total hemispherical reflectance (THR) below 1.5% in the visible spectrum. An example of such a material is a line of products offered under the brand name Vantablack® by Surrey NanoSystems Limited of the United Kingdom. Vantablack® is available as coating of vertical tubes which are grown on a substrate using a modified chemical vapor deposition (CVD) process. It is also available as a sprayable paint that uses randomly aligned carbon nanotubes. These products facilitate very high levels of absorption of optical energy in the range from ultraviolet to the terahertz portion of the spectrum. The shield 304 provides the necessary rigid support for the highly absorptive surface coating.

The strut 302 is advantageously thermally decoupled from the rigid shield. For example, with reference to FIG. 4 it can be observed that one or more insulating layers 402 can be disposed between the rigid strut and the rigid shield. According to one aspect, the one or more insulating layers can form a multi-layer insulation (MLI) system 404 to control transfer of thermal energy due to thermal radiation. In some scenarios, the one or more layers comprising the MLI can be formed of a thin sheet of polymer or plastic such as Mylar or Kapton. In some scenarios, the layers can have a thickness of about 6 µm but the solution is not limited in this regard. The layers of the MLI can be physically very close to each other, provided that they are separated by a gap to prevent thermal contact. The gap between layers can be ensured by using a very thin scrim or polyester mesh.

The shield is advantageously supported on the strut with one or more brackets disposed at various locations along the length of the strut. The brackets can include a one or more hard or rigid brackets 308 disposed at a first location along the length of the strut, and one or more flexure brackets 310 disposed at a one or more locations along the length of the strut. The purpose of these brackets is to maintain the shield in a substantially fixed positional relationship relative to the strut. For example, in some scenarios the brackets can maintain a position of these two elements so that an elongated axis of the shield is concentric with the elongated axis of the strut. However, the solution is not limited in this regard and in some scenarios an axis defined by the elongated length of the strut may be radially offset from a central axis defined by the elongated length of the shield. The rigid and flexure brackets are discussed in further detail below.

Figure 4:
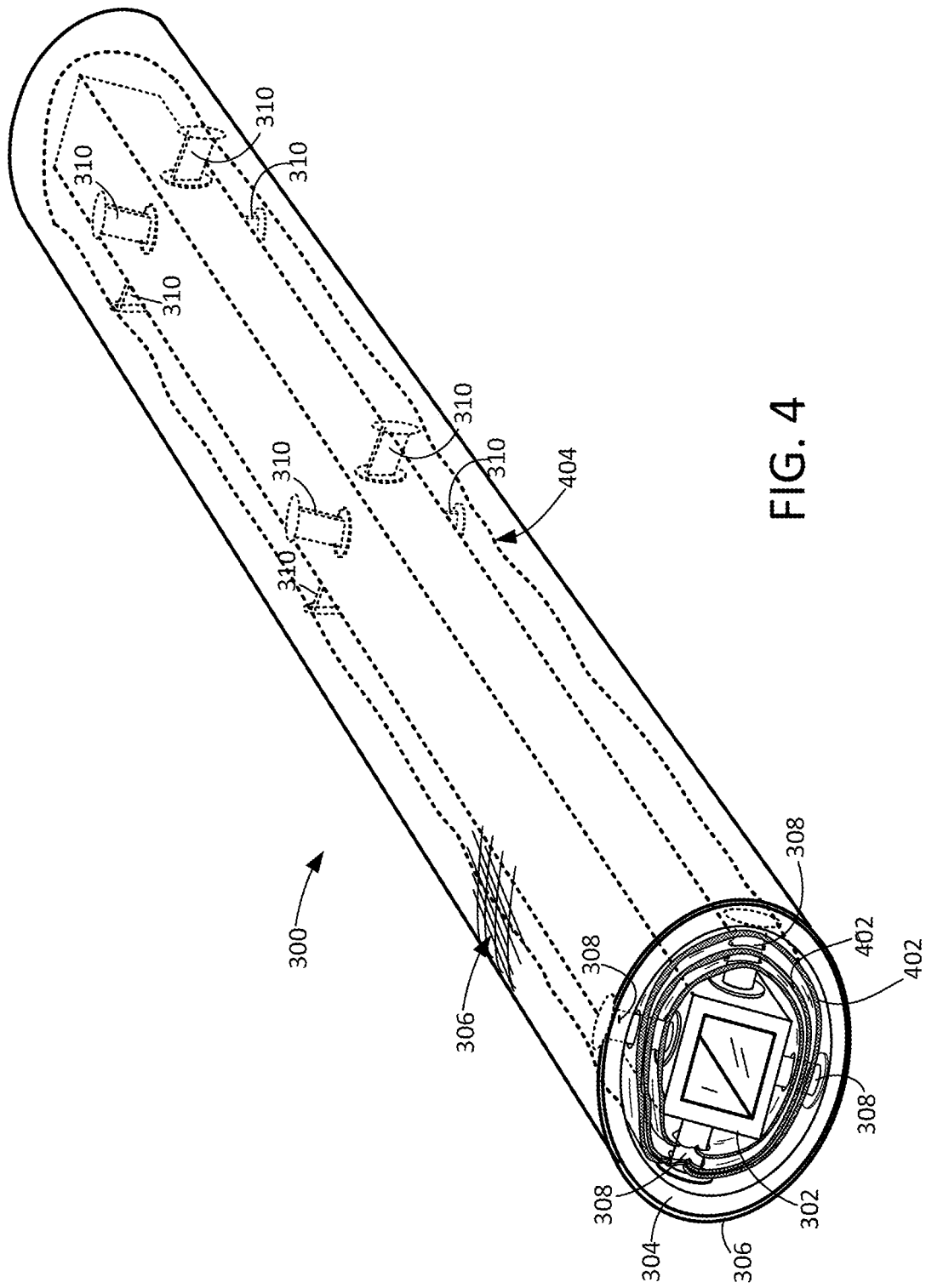
FIG. 4 is a drawing that is useful for understanding how multi-layer insulation is incorporated into the space between the rigid shield and strut in the assembly shown in FIG. 3
Figure 5A:
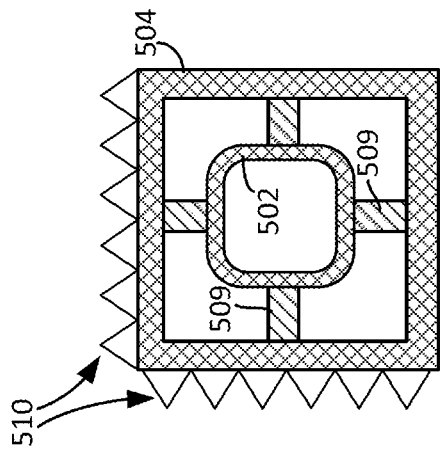
FIGS. 5A-5F are a series of drawings which are useful for understanding various cross-sectional profile configurations of struts and rigid shields which can be used in an assembly for constructing a metering structure.
Figure 5B:
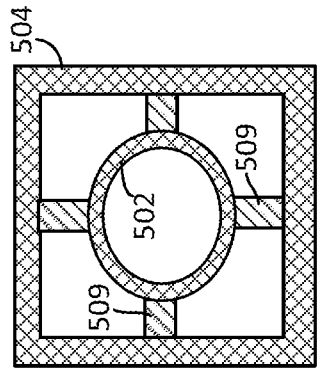
Figure 5C:
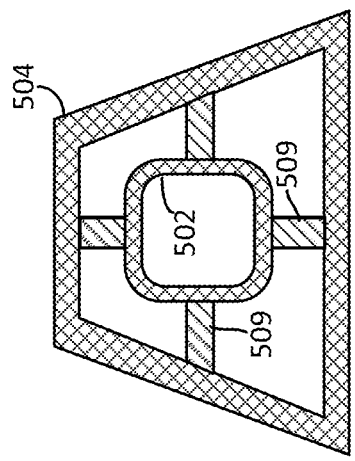
Figure 5D:
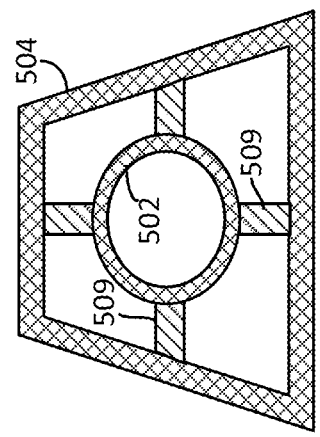
Figure 5E:
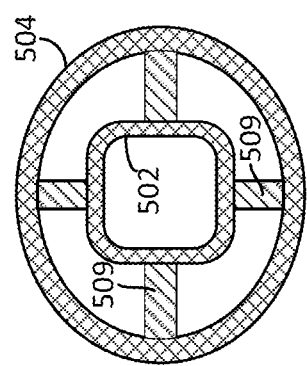
Figure 5F:
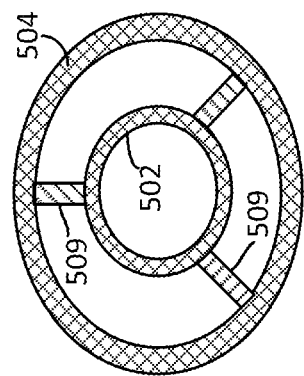

The shielded strut configuration shown in FIGS. 3 and 4 includes a strut having a square or rectangular cross-sectional profile shape, and a shield having a circular or elliptical cross-sectional profile shape. However, the solution is not limited in this regard and the shielded strut configuration as described allows a wide variation in cross-sectional profile shape of the strut and the shield. Further, with reference to FIGS. 5A-5F, it can be observed that various different combinations of cross-sectional profile shape can be used with the shielded strut configuration as described herein. Any suitable combination of strut 502 and shield 504 can be used to facilitate a particular design. Shown in these examples are shield/strut cross-sectional shape combinations including circular/square (FIG. 5A), trapezoidal/square (FIG. 5B), square/square (FIG. 5C), elliptical/circular (FIG. 5D), trapezoidal/circular (FIG. 5E), and square/circular (FIG. 5F). The foregoing are merely presented as example configurations and the solution is not intended to be limited in this regard. The outer surface of each shield can be smooth or planar as shown in FIGS. 5A-5B, and FIGS. 5D-5F. However, it can be advantageous in some scenarios to contour or shape the outer surface to include a three-dimensional surface pattern. For example, FIG. 5C shows a shield 504 which includes a three-dimensional surface pattern 510. The three-dimensional surface pattern 510 can be advantageously selected to further reduce reflection of stray light. A corrugated three-dimensional surface pattern is illustrated in FIG. 5C but it should be understood that the solution is not limited in this regard and other three-dimensional surface patterns are possible.

It may be noted in FIGS. 5A-5F that different combinations may include a greater or lesser number of support brackets 509 (rigid and/or flexure) between the strut and the shield at a particular location along the length of the strut. For example, four brackets are used at a particular location along the length of the strut in FIGS. 5A-5C and FIGS. 5E-5F. In contrast, only three brackets are used at a particular location along the length of the strut in FIG. 5D. The exact number of brackets at a particular location along the length of the strut, and the radial positional relationship of such brackets around the periphery of the strut is not critical. Instead, the number of brackets at a particular location along the length of the strut and the position of such brackets can vary in accordance with the cross-sectional profile shape combination selected for the shield and the strut, as well as certain other design considerations.

The shielded strut configuration described herein has several advantages in a metering structure. One advantage is the decoupling of the cross-sectional shape of the shield from the cross-sectional shape of the strut. This allows a designer to optimize the cross-sectional profile shape of the strut for satisfying the structural support requirements of the metering structure while also optimizing the cross-sectional shape of the shield for reducing the amount of stray light that is reflected toward one or more optical elements of the optical sensor system. For example, in FIG. 5B the strut has a rectangular cross-sectional shape, but a trapezoidal cross-sectional shape is selected for the shield 504. The trapezoidal shaped profile can in some scenarios help reduce reflections from stray light more effectively as compared to a rectangular profile. Similarly, in FIG. 5E the strut has a circular cross-sectional shape, but a trapezoidal cross-sectional shape is selected for the shield 504.

Figure 6:
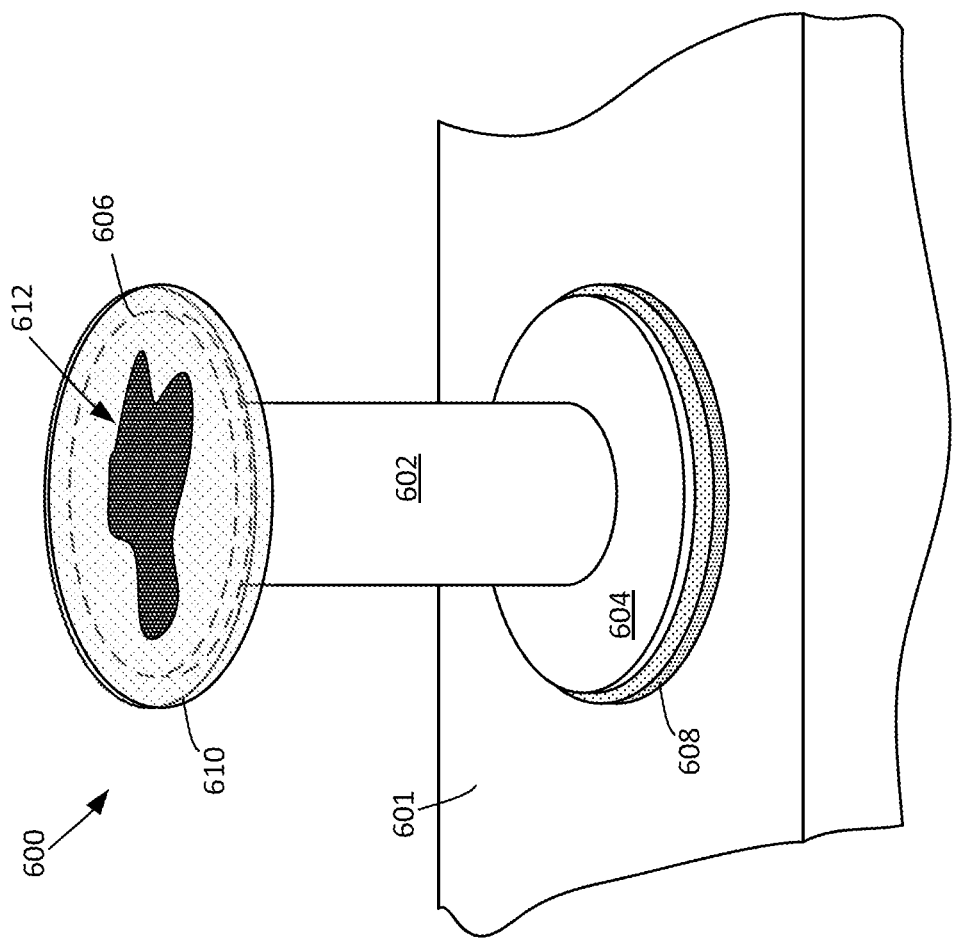
FIG. 6 is a drawing that is useful for understanding a rigid bracket that is used to maintain a positional relationship between a rigid shield and a strut.

An example of a rigid bracket used for attaching the shield to the strut is shown in FIG. 6. The rigid bracket 600 can include a rigid post 602 disposed between opposing end flanges 604, 606. The rigid post can have a length which is sufficient to provide a predetermined space between the outer surface of the strut 601 and the inner surface (not shown in FIG. 6) of the shield. A thickness and a cross-sectional profile of the rigid post are selected to ensure that the rigid bracket is not susceptible to flexing or bending as a result of forces applied by the shield and the strut.

The end flanges 604, 606 serve as an attachment and stabilizing structure to support the bracket on the outer face of the strut 601 and the inner face of the shield (not shown in FIG. 6). The end flanges can be secured to the strut by any suitable means. An example of a suitable attachment mechanism can include an adhesive 612. Other examples include screws, rivets, clips and so on which mechanically attach the end flange 604, 606 to a corresponding surface of the strut or the shield. The rigid bracket 600 can be formed of a lightweight composite material, a metal alloy or any other material which will exhibit structural rigidity under the anticipated environmental conditions in which the metering structure is to be deployed. The rigid bracket 600 is advantageously designed to minimize heat transfer between the rigid shield and strut. To facilitate this feature, the post 602 and/or the opposing end flanges 604, 606 can be formed of a material having a low thermal conductivity. Alternatively, the rigid bracket 600 may have one or more thermal isolation elements 608, 610 that minimize overall thermal conductance between the strut and the shield. Such elements can include thermal isolation washers, fasteners, gaskets, and so on which are formed of material that has a low thermal conductivity.

Figure 7B:
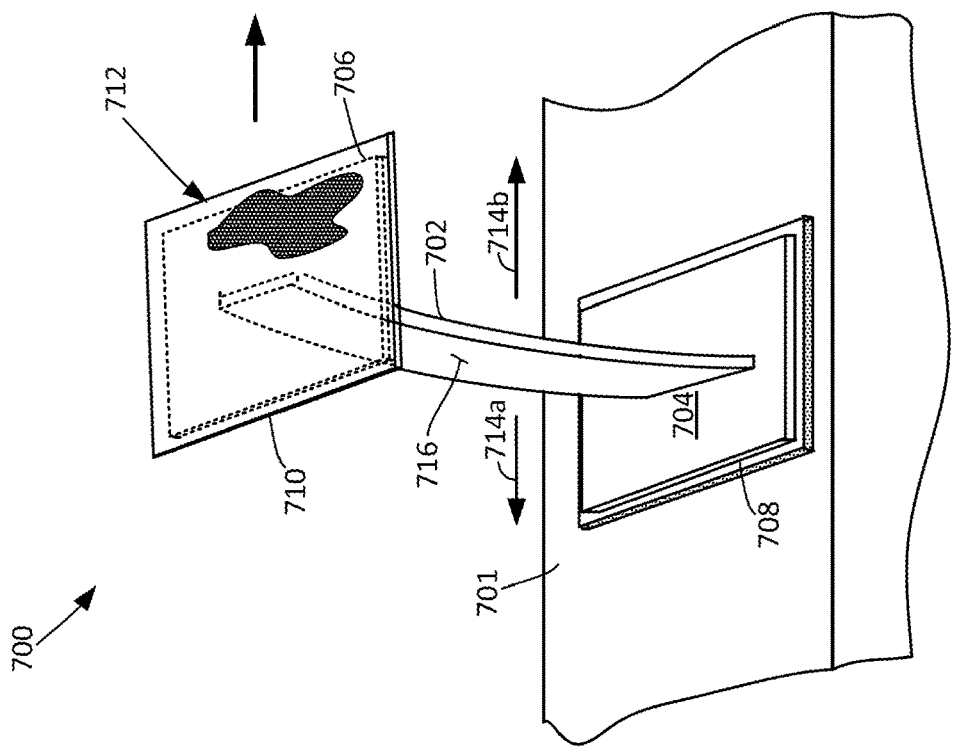
FIGS. 7A and 7B are a series of drawings that are useful for understanding a flexure bracket that is used to maintain a positional relationship between a rigid shield and a strut.
Figure 7A:
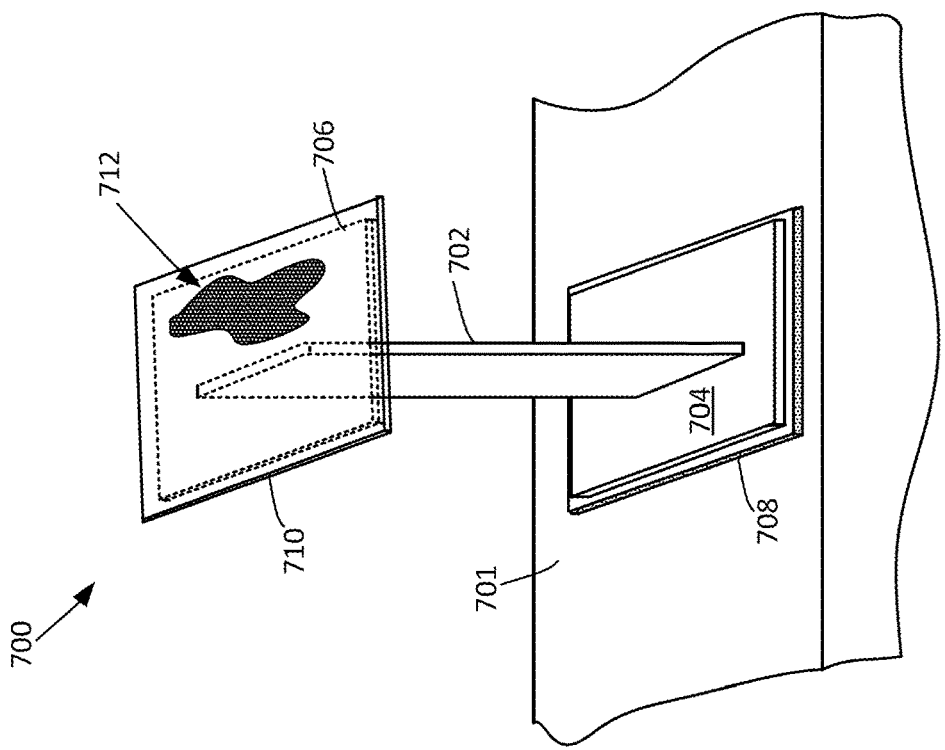

An example of a flexure bracket used for attaching the shield to the strut is shown in FIGS. 7A and 7B. The flexure bracket is shown in an unstressed condition in FIG. 7A and a stressed of flexure condition in FIG. 7B. The flexure bracket 700 can include a flexible post 702 disposed between opposing end flanges 704, 706. The flexible post can have a length which is sufficient to provide a predetermined space between the outer surface of the strut 701 and the inner surface (not shown in FIG. 7) of the shield. A thickness and a cross-sectional profile of the flexible post are selected to ensure that the flexure bracket will facilitate a flexure or bending function responsive to dynamic dimensional variation of the strut and/or shield. It will be understood that such dynamic dimensional variation in the strut and/or shield can occur as a result of temperature differences and mismatched CTE as between the strut and the shield.

The end flanges 704, 706 of the flexure bracket serve as an attachment and stabilizing structure to support the bracket on the outer face of the strut 701 and the inner face of the shield (not shown in FIG. 7). The end flanges can be secured to the strut by any suitable means. An example of a suitable attachment mechanism can include an adhesive 712. Other examples include screws, rivets, clips and so on which mechanically attach the end flange 704, 706 to a corresponding surface of the strut or the shield. The flexure bracket 700 can be formed of a lightweight composite material, a metal alloy or any other material which will exhibit a predetermined degree of structural flexibility under the anticipated environmental conditions in which the metering structure is to be deployed. The flexure bracket 700 is advantageously designed to minimize heat transfer between the rigid shield and strut. To facilitate this feature, the post 702 and/or the opposing end flanges 704, 706 can be formed of a material having a low thermal conductivity. Alternatively, the flexure bracket 700 may have one or more thermal isolation elements 708, 710 that minimize overall thermal conductance between the strut and the shield. Such elements can include thermal isolation washers, fasteners, gaskets, and so on which are formed of material that has a low thermal conductivity.

The post 702 of the flexure bracket shown in FIGS. 7A and 7B has a thin planar reed-like structure which can allow the post to resiliently deflect or flex in directions 714a and 714b, which are transverse to a broad face 716 of the post. In FIG. 7B, the post is arranged so that directions 714a, 714b are aligned with the elongated length of the strut and shield. However, it should be understood that the solution is not limited in this regard. The post 702 can also be configured to facilitate flexure in directions which are transverse to the elongated length of the strut. In some scenarios, the flexure bracket can be configured to flex in directions which are both aligned with the elongated length of the strut and transverse to the elongated length of the strut. Such flexure can be facilitated by carefully selecting one or more of a cross-sectional profile of the strut and a material from which the strut is formed. For example, the post can in some scenarios be formed of a flexible polymer material. A post made of such material can deform when under stress to accommodate thermally induced mechanical stresses in the shielded strut. The post made from the flexible polymer material can subsequently return to its original shape when the mechanical stress is removed. It should be understood that the exact configuration of the flexure bracket is not critical provided that it is capable of facilitating one or more of the flexure functions described herein.

A bracket system including at least one rigid bracket and one or more flexure brackets as shown and described herein can reduce mechanical stresses which may result from potentially large differences in temperature between the shields and the struts. In some scenarios, the attachment system for a particular strut can include a single rigid bracket to attach the shield to the strut at a first location, and one or more flexure brackets disposed at one or more other locations spaced along the elongated length of the strut. The rigid or hard mount bracket can provide a point of positional stability for the shield relative to the strut. The one or more flexure brackets can allow thermally induced dimensional variations in the strut versus the shield to be accommodated while still ensuring a desired radial spacing between the two components. In this regard, the flexure brackets are configured to absorb mechanical stresses caused by a coefficient of thermal expansion (CTE) mismatch between the shield and the strut.

Figure 8:
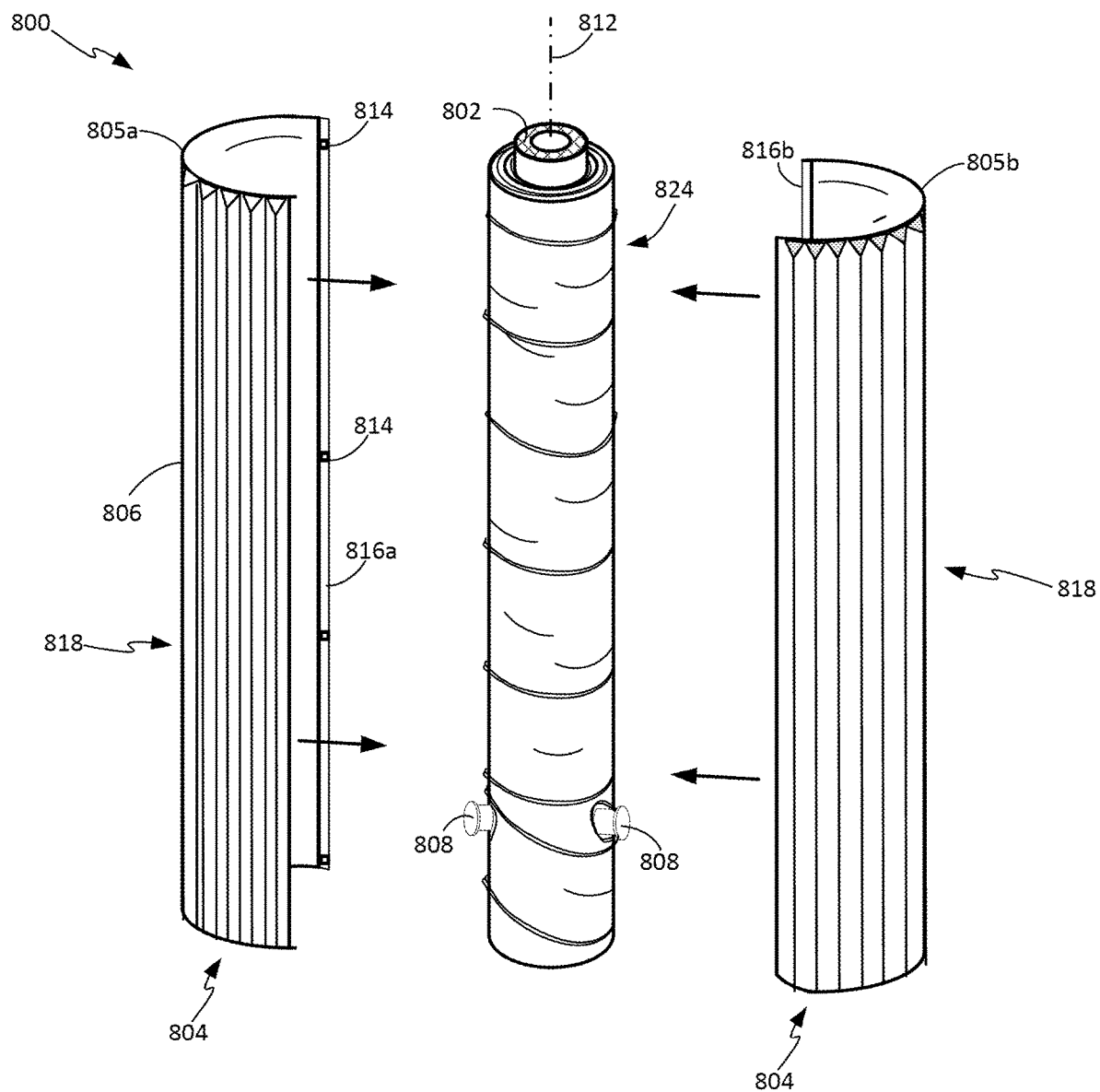
FIG. 8 is a drawing that is useful for understanding a rigid shield that is formed from a plurality of shield elements.

In some scenarios, it can be advantageous for the rigid shield to be formed of two or more shield members which respectively form opposing sides of the rigid shield. Such arrangement is shown in FIG. 8 and can facilitate assembly of a shielded strut as described. The shielded strut 800 extends along a central axis 812 and is comprised of an elongated rigid strut 802 that is used to support an optical element in a metering structure. Only a single strut is shown in FIG. 8, but it will be understood that a metering system can comprise a plurality of such rigid struts which form the structure of the metering system. A rigid shield 804 formed of two or more shield members 805a, 805b surrounds the elongated length of the strut and supports a light absorption coating 806 on its surface. One or more insulating layers are wrapped around the rigid strut to form a multi-layer insulation (MLI) system 824. Also shown in FIG. 8 are one or more brackets 808 (e.g., rigid or flexure brackets) disposed at a first location along the elongated length of the strut. In the embodiment of FIG. 8, the shield members 805a, 805b form opposing sides of the shield along its elongated length aligned with axis 812. One or more fastener elements can be used to join the opposing shield members along adjoining edges 816a, 816b. In some scenarios, each of the shield members 805a, 805b can have a surface structure 818 configured to reduce reflections of stray light. In this example a corrugated surface structure is shown, but the solution is not limited in this regard and any other suitable surface structure can be employed to reduce reflections of stray light.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A metering structure for an optical sensor, comprising:
a rigid strut having an elongated length and configured to support in a position an optical element of an optical sensor system;
a rigid shield mounted on the strut and having a shield length substantially coextensive with the elongated length, the rigid shield enclosing the strut along the shield length; and
a surface finish highly absorptive of electromagnetic radiation in the optical spectrum and disposed on an exterior surface of the rigid shield along the shield length.

2. The metering structure of claim 1, further comprising a plurality of thermal insulating material layers forming a multi-layer insulation (MLI) system disposed between the rigid strut and the rigid shield, the MLI system surrounding the rigid strut and substantially coextensive with the shield length.

3. The metering structure of claim 1, wherein the rigid shield has a cross-sectional profile shape that is different as compared to a cross-sectional profile shape of the rigid strut.

4. The metering structure of claim 3, wherein the cross-sectional profile shape of the rigid shield is configured to minimize reflection of stray electromagnetic radiation in the optical spectrum.

5. The metering structure of claim 1, wherein rigid shield is mounted on the strut using a rigid bracket at a first location along the elongated length.

6. The metering structure of claim 5, wherein at least one thermal isolating component associated with the rigid bracket is comprised of a low thermal conductivity material configured to minimize transmission of thermal energy between the rigid strut and the rigid shield.

7. The metering structure of claim 5, wherein the rigid shield is mounted on the strut with the rigid bracket at only one location along the elongated length.

8. The metering structure of claim 5, wherein the rigid shield is mounted on the strut using a flexure bracket at one or more second locations spaced apart from the first location along the elongated length, the flexure bracket configured to flex in a direction aligned with an axis of the strut.

9. The metering structure of claim 1, wherein the rigid shield is mounted on the strut using one or more flexure brackets which are configured to flex in a direction aligned with a major axis of the strut, whereby mechanical stresses caused by a coefficient of thermal expansion (CTE) mismatch between the rigid shield and the strut are absorbed.

10. The metering structure of claim 1, wherein the rigid shield is comprised of two or more shield members which respectively form opposing sides of the rigid shield.

11. The metering structure of claim 1, wherein the surface finish is a coating comprised of carbon nanotubes.

12. The metering structure of claim 1, wherein the rigid shield defines a surface structure configured to reduce reflections of stray electromagnetic radiation in the optical spectrum.

13. A metering structure for an optical sensor, comprising:
a rigid strut having an elongated length and configured to support in a position an optical element of an optical sensor system;
a rigid shield mounted on the strut and having a shield length substantially coextensive with the elongated length, the rigid shield enclosing the strut along the shield length;
the rigid shield having a surface finish which is highly absorptive of electromagnetic radiation within the optical spectrum and disposed on an exterior surface of the rigid shield along the shield length;
one or more material layers between the rigid shield and the rigid strut configured to thermally decouple the rigid strut from the rigid shield; and
the rigid shield is mounted on the strut using one or more flexure brackets disposed at one or more locations along the elongated length, the flexure brackets configured to flex in a direction aligned with a major axis of the strut whereby mechanical stresses caused by a coefficient of thermal expansion (CTE) mismatch between the rigid shield and the strut are absorbed.

14. A method for providing a thermally stable metering structure, comprising:
using a rigid strut having an elongated length to support in a position an optical element of an optical sensor system;
using a rigid shield mounted on the strut to support a surface finish which is highly absorptive of electromagnetic energy within the optical spectrum, the rigid shield surrounding the strut along the elongated length; and
thermally decoupling the rigid strut from the rigid shield using one or more insulating layers disposed between the rigid strut and the rigid shield;

supporting the rigid shield on the strut using one or more flexure brackets disposed at one or more locations spaced apart along the elongated length; and absorbing with the one or more flexure brackets mechanical stresses caused by a coefficient of thermal expansion (CTE) mismatch between the rigid shield and the rigid strut are absorbed.

15. The method of claim 14, further comprising selecting a cross-sectional profile shape of the rigid shield that is different as compared to a cross-sectional profile shape of the rigid strut.

16. The method of claim 15, further comprising selecting the cross-sectional profile shape of the rigid shield to minimize reflection of stray electromagnetic energy in the optical spectrum.

17. The method of claim 14, further comprising securing the rigid shield on the strut using a rigid bracket at a first location along the elongated length.

18. The method of claim 17, further comprising minimizing transmission of thermal energy between the rigid strut and the rigid shield using at least one thermal isolating component comprised of a low thermal conductivity material to minimize transmission of thermal energy through the rigid bracket.

19. The method of claim 17, further comprising securing the rigid shield to the rigid strut with the rigid bracket at only one location along the elongated length.

20. The method of claim 14, further comprising assembling the rigid shield on the rigid strut by joining two or more shield members which respectively form opposing sides of the rigid shield.

21. The method of claim 14, further comprising providing the surface finish with a coating comprised of carbon nanotubes disposed on an outer surface of the rigid shield.

* * * * *